US008087026B2

(12) United States Patent
Zhong

(10) Patent No.: US 8,087,026 B2
(45) Date of Patent: Dec. 27, 2011

(54) FAIR SHARE SCHEDULING BASED ON AN INDIVIDUAL USER'S RESOURCE USAGE AND THE TRACKING OF THAT USAGE

(75) Inventor: Enci Zhong, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1375 days.

(21) Appl. No.: 11/412,758

(22) Filed: Apr. 27, 2006

(65) Prior Publication Data

US 2007/0256077 A1    Nov. 1, 2007

(51) Int. Cl.
*G06F 9/46* (2006.01)

(52) U.S. Cl. ........................................ 718/104

(58) Field of Classification Search ............... 718/104
See application file for complete search history.

(56) References Cited

U.S. PATENT DOCUMENTS

| | | | |
|---|---|---|---|
| 5,963,963 A | 10/1999 | Schmuck et al. | 707/205 |
| 6,195,676 B1 | 2/2001 | Spix et al. | 709/107 |
| 6,314,460 B1 | 11/2001 | Knight et al. | |
| 6,401,223 B1 | 6/2002 | DePenning | |
| 6,499,063 B1 | 12/2002 | Chessell et al. | |
| 6,571,288 B1 * | 5/2003 | Sarukkai | 709/226 |
| 6,594,786 B1 | 7/2003 | Connelly et al. | |
| 6,618,742 B1 * | 9/2003 | Krum | 718/100 |
| 6,625,709 B2 * | 9/2003 | Aiken et al. | 711/170 |
| 6,785,889 B1 | 8/2004 | Williams | 718/104 |
| 6,909,691 B1 * | 6/2005 | Goyal et al. | 370/230 |
| 6,959,320 B2 | 10/2005 | Shah et al. | |
| 7,139,784 B2 | 11/2006 | Knobe et al. | |
| 7,171,668 B2 * | 1/2007 | Molloy et al. | 718/105 |
| 7,206,849 B1 | 4/2007 | Gernert et al. | |
| 7,241,044 B1 * | 7/2007 | Kitamura et al. | 700/159 |
| 7,698,251 B2 | 4/2010 | Brelsford et al. | |
| 2002/0052947 A1 | 5/2002 | Duimovich et al. | |
| 2004/0226015 A1 | 11/2004 | Leonard et al. | |
| 2004/0249904 A1 | 12/2004 | Moore et al. | |
| 2004/0253940 A1 | 12/2004 | Andrews et al. | 455/405 |
| 2005/0021306 A1 | 1/2005 | Garcea et al. | |

(Continued)

OTHER PUBLICATIONS

Elmroth, E.; Gardfjall, P.; Design and evaluation of a decentralized system for grid-wide fairshare scheduling; Jul. 1, 2005; First International Conference on e-Science and Grid Computing, 2005.*

(Continued)

*Primary Examiner* — Meng An
*Assistant Examiner* — Blake Kumabe
(74) *Attorney, Agent, or Firm* — Matthew W. Baca, Esq.; Kevin P. Radigan, Esq.; Heslin Rothenberg Farley & Mesiti P.C.

(57) ABSTRACT

Fair share scheduling to divide the total amount of available resource into a finite number of shares and allocate a portion of the shares to an individual user or group of users as a way to specify the resource proportion entitled by the user or group of users. The scheduling priority of jobs for a user or group of users depends on a customizable expression of allocated and used shares by that individual user or group of users. The usage by the user or group of users is accumulated and an exponential decay function is applied thereto in order to keep track of historic resource usage for a user or group of users by one piece of data and an update timestamp.

16 Claims, 9 Drawing Sheets

U.S. PATENT DOCUMENTS

2005/0055694 A1 3/2005 Lee .............................. 719/100
2008/0103861 A1 5/2008 Zhong

OTHER PUBLICATIONS

J. Kay and P. Lauder; A Fair Share Scheduler; Jan. 1988; Communications of the ACM; vol. 31 No. 1; p. 44-55.*

"Fair Share", Maui Scheduler Administrator's Manual, anusf.anu.edu.au/~dbs900/PBS/Maui/fairshare.html.

DPCS/LCRM Reference Manual, .llnl.gov.LCdocs/dpcs/index.jsp?show-s5.1.

"LoadLeveler for AIX 5L and Linux—Using and Administering", Version 3, Release 3.1, SA22-7881-04, Nov. 2005, pp. 36-37, 201, 258-259 and 274-275.

Malluhi et al., "Coding for high availability of a distributed-parallel storage system," Dept. of Comput. Sci; Jacksonville State Univ.; AL; USA; IEEE Transactions on Parallel and Distributed Systems, vol. 9, No. 12, pp. 1237-1252, Dec. 1998 (Abstract Only).

Levy et al., "Distributed File Systems: Concepts and Examples," ACM Computing Surveys, vol. 22, No. 4, Dec. 1990, pp. 321-374.

Hu et al., "Run-Time Support for Distributed Sharing in Safe Languages," ACM Transactions on Computer Systems, vol. 21, No. 1, Feb. 2003, pp. 1-35.

Sen et al., "Analyzing Peer-To-Peer Traffic Across Large Networks," IEEE/ACM Transactions on Networking, vol. 12, No. 2, Apr. 2004, pp. 219-232.

Lucash et al., "Reconciliation of Independently Updated Distributed Data," U.S. Appl. No. 11/272,221, filed Nov. 10, 2005. (Abandoned).

Massie, Matthew et al., "The Ganglia Distributed Monitoring System: Design, Implementation, and Experience," El Servier Parallel Computing, Jun. 15, 2004, pp. 817-838.

Office Action for U.S. Patent No. 7,698,251 dated Apr. 27, 2006.

Final Office Action for U.S. Patent No. 7,698,251 dated Oct. 23, 2008.

Office Action for U.S. Patent No. 7,698,251 dated Apr. 10, 2009.

Final Office Action for U.S. Patent No. 7,698,251 dated Oct. 26, 2009.

Office Action for U.S. Appl. No. 11/552,554 dated Jul. 20, 2010.

Final Office Action for U.S. Appl. No. 11/552,554 dated Dec. 20, 2010.

* cited by examiner

FAIR SHARE SCHEDULING BASED ON AN INDIVIDUAL USER'S RESOURCE USAGE AND THE TRACKING OF THAT USAGE

CROSS-REFERENCE TO RELATED APPLICATIONS

This application contains subject matter which is related to the subject matter of the following application, which is assigned to the same assignee as this application. The below listed application is hereby incorporated herein by reference in its entirety:

"FAULT TOLERANT FACILITY FOR THE AGGREGATION OF DATA FROM MULTIPLE PROCESSING UNITS", Brelsford et al., U.S. Letters Pat. No. 7,698,251 B2, issued Apr. 13, 2010.

TECHNICAL FIELD

This invention relates, in general, to fair share scheduling, and in particular, to a fair share scheduling capability that is based on an individual user's resource usage and that facilitates the tracking of that usage.

BACKGROUND OF THE INVENTION

Fair share scheduling is a functional feature in workload management products. In a distributed processing environment, such as a clustered environment, workload management software products are used to schedule user programs or jobs to run on various machines of the environment. Fair share scheduling drives the scheduling decisions in the direction of dividing the processing resources among users or groups of users according to predefined proportions.

In fair share scheduling, a user or group of users is allocated a certain proportion of the resources of the environment and the scheduling priority of jobs of that user or group of users is dependent on the amount of resources used by the user or group of users as compared against the resources used by all users or groups of users. Thus, the scheduling priority of jobs of one user or group of users is dependent on the amount of resources consumed by other users. The proportion of resources is often expressed as a percentage of total resource usage.

This scheduling based on resource consumption by others may produce unstable and undesirable scheduling for the individual user. It is unstable because it is dependent on the workload of others, which may change drastically at any point in time. It is undesirable because it is based on resource consumption by other users.

In fair share scheduling, the historic resource usage decay over time to allow the more recently used resources to have larger influence on the scheduling decisions. A mechanism to record and decay the historic resource usage is necessary and it is often accomplished through a stepwise decay function over a number of recent intervals of finite length. A large amount of historic resource usage data may need to be tracked for a cluster with many users.

SUMMARY OF THE INVENTION

Based on the foregoing, a need exists for an enhanced fair share scheduling capability that is more stable and fair to the individual users or groups of users. Further, a need exists for an approach that simplifies the decay mechanism and minimizes the amount of historic resource usage data to track.

The shortcomings of the prior art are overcome and additional advantages are provided through the provision of a method of facilitating determination of scheduling priorities of jobs in a processing environment. The method includes, for instance, obtaining an indication of an amount of resource that is available in the processing environment, this amount being independent of consumption of the resource and subject to an exponential decay function; dividing the amount of resource among a plurality of usage shares; allocating zero or more usage shares of the resource to a user entity of the processing environment, the zero or more usage shares being at least a portion of a plurality of usage shares defined for the processing environment based on a total amount of the resource available in the processing environment and the one or more usage shares representing an amount of the resource available for use by the user entity independent of an amount of the resource consumed by other user entities of the processing environment; assigning a job scheduling priority to a job of the user entity to be executed, the job scheduling priority being based on allocated and used usage shares of the user entity and is independent of historic usage of the resource by other user entities; and collecting resource usage data, wherein the collecting comprises accumulating data associated with usage of the resource by the user entity, the accumulated data including contribution from past resource usage by the user entity, and wherein a decay function is applied at least once during the accumulating.

In a further aspect, a method of facilitating determination of scheduling priorities of jobs in a clustered computing environment having a plurality of coupled computing units is provided. The method includes, for instance, selecting a number of usage shares of a resource of the clustered computing environment that is to be available for allocation to one or more user entities of the clustered computing environment; obtaining an indication of an amount of the resource that is available in the clustered computing environment, the amount being independent of consumption of the resource and subject to an exponential decay function; dividing the amount of the resource among the selected number of usage shares; allocating zero or more usage shares of the selected number of usage shares to a user entity of the clustered computing environment, the one or more usage shares allocated to the user entity representing a portion of the amount of resource available in the clustered computing environment and representing an amount of the resource available for use by the user entity independent of an amount of the resource consumed by other user entities of the processing environment; determining job scheduling priority for a job of the user entity to be executed, the determining being based on used usage shares of the user entity as compared to allocated usage shares of the user entity, and is independent of use of the resource by one or more other user entities; scheduling the job to execute based on the job scheduling priority; and collecting resource usage data, in response to at least one of termination of the job and periodically, wherein the collecting includes accumulating data associated with usage of the resource by the user entity, the accumulated data including contribution from past resource usage by the user entity, if any, and wherein an exponential decay function is applied at least once during the accumulating, the collected resource usage data being usable for determining job scheduling priority for one or more other jobs of said user entity.

System and computer program products corresponding to one or more of the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a fair share scheduling capability is provided that enables the stable and fair scheduling of jobs of an individual user or group of users. The scheduling depends on resource allocation and usage by that individual user or group of users, instead of allocation and usage by other users or groups of users. Available resources of a processing environment are divided into a number of shares. These are the resources that are configured for the environment and available to be used, independent of resource consumption. A user or group of users is allocated a portion of the shares. Then, each job of the user or group of users to be executed is assigned a job execution priority. This priority is based on how many shares the user or group of users has been assigned and has used and is independent of resource usage by others in the processing environment.

Since job scheduling priority is affected by the number of shares used by the user or group of users compared to the number allocated, resource usage by the user or group of users is tracked and accumulated. Further, in accordance with an aspect of the present invention, job scheduling priority is affected more by current usage than by distant usage, and therefore, an exponential decay mechanism is applied against the accumulated data to place more weight on current usage and less weight on distant usage.

One embodiment of a processing environment incorporating and using one or more aspects of the present invention is described with reference to FIG. 1. In one example, the processing environment is a distributed processing environment, such as a clustered environment, in which resources of the environment are shared to perform system tasks. Although a clustered environment is described herein as incorporating and using one or more aspects of the present invention, other types of environments, including non-clustered environments, may benefit from one or more aspects of the present invention.

Figure 1:
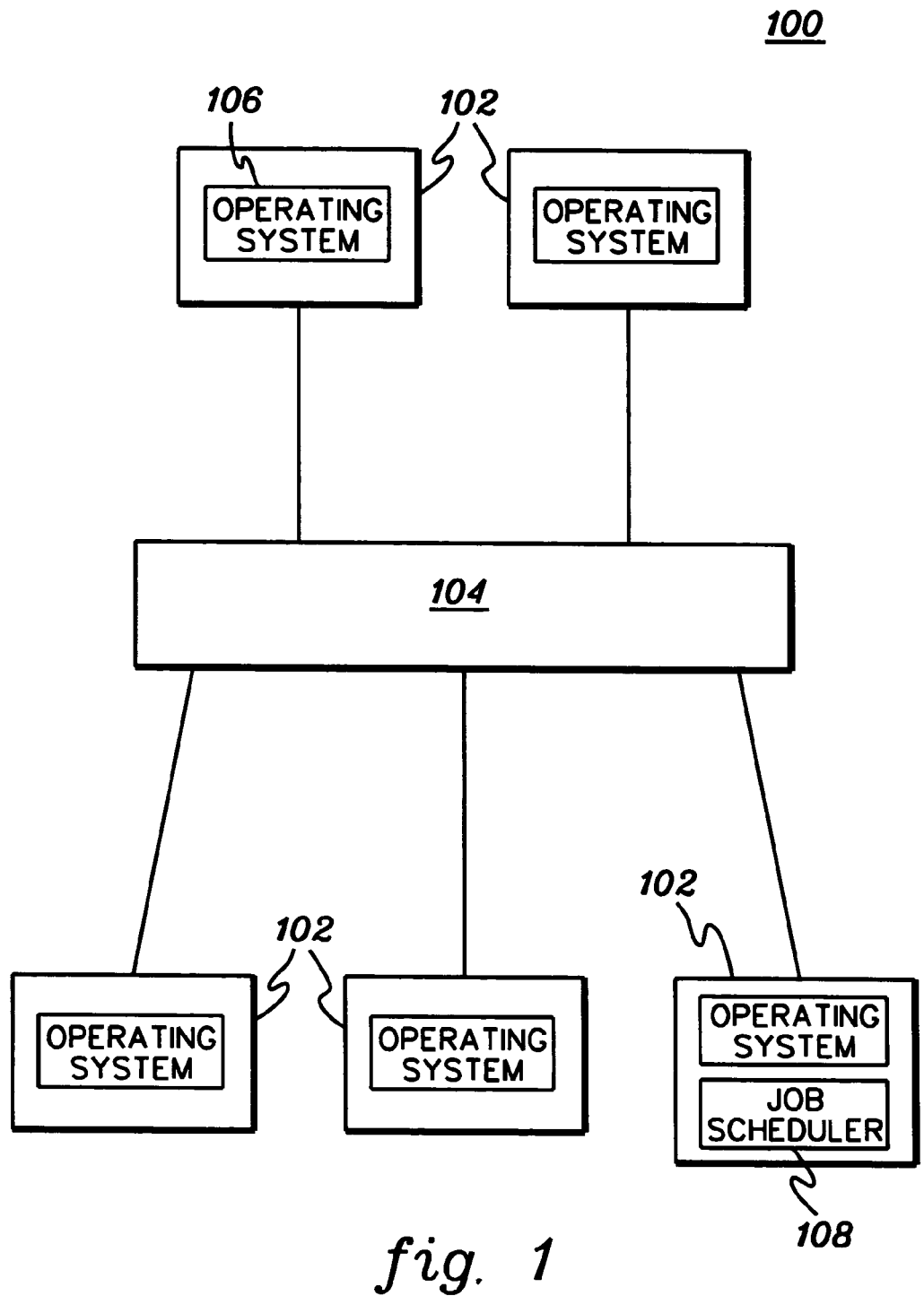
FIG. 1 depicts one embodiment of a processing environment incorporating and using one or more aspects of the present invention.

FIG. 1 depicts a clustered environment 100 including, for instance, a plurality of processing units 102 coupled to one another via one or more connections 104. Connections 104 include, but are not limited to, wire connections, wireless connections or any type of network connection, such as a local area network (LAN), a wide area network (WAN), a token ring, an Ethernet connection, etc.

In one example, the processing units include, for instance, personal computers, laptops, workstations, mainframes, mini computers or any other type of processing units. As one particular example, each processing unit is a pSeries® server offered by International Business Machines Corporation, Armonk, N.Y. ("pSeries" is a registered trademark of International Business Machines Corporation, Armonk, N.Y.) Each processing unit may or may not be the same type of processing unit as another unit. In one example, each processing unit executes an operating system 106, such as LINUX, or AIX® offered by International Business Machines Corporation. ("AIX" is a registered trademark of International Business Machines Corporation, Armonk, N.Y.) The operating system of one processing unit may be the same or different from another processing unit. Further, in other examples, one or more of the processing units may not include an operating system.

In accordance with an aspect of the present invention, one or more of the processing units, referred to herein as managers, execute a job scheduler 108. Job scheduler 108 is, for instance, a program that is responsible for scheduling jobs of user entities. As used herein, the term user entity refers to a user or group of users. The job scheduler schedules the jobs using a fair share scheduling technique.

The fair share scheduling technique of an aspect of the present invention defines resource usage shares based on the total amount of resources available in the processing environment, instead of the total amount of resources consumed by the users. Additionally, job scheduling priority is assigned based on the allocated shares, as well as the shares used by an individual user. Further details regarding the fair share scheduling capability of an aspect of the present invention are described with reference to the figures.

Figure 2:
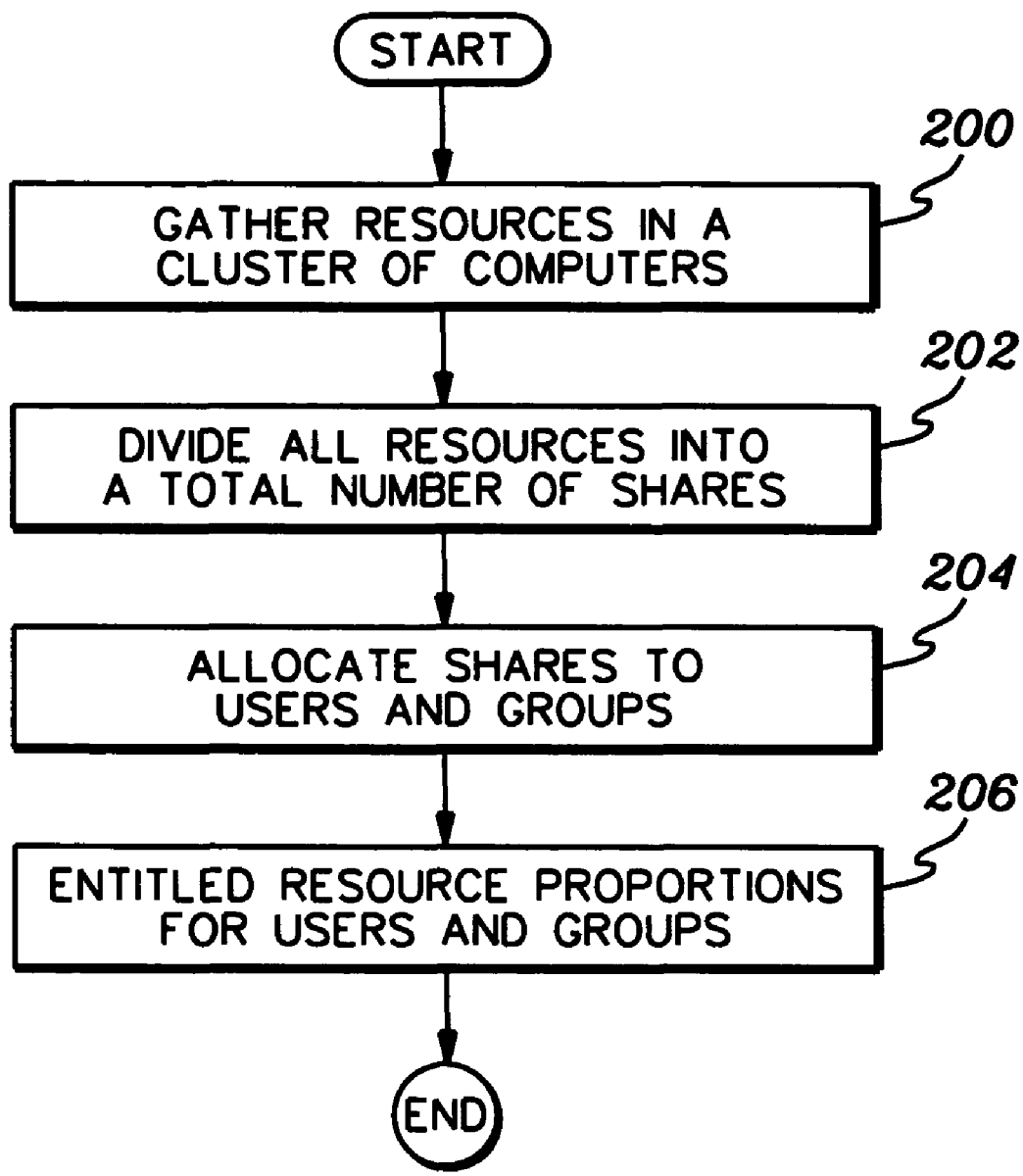
FIG. 2 depicts one embodiment of the logic used to allocate resource usage shares, in accordance with an aspect of the present invention.

Referring initially to FIG. 2, one embodiment of the logic associated with allocating shares of resources to user entities is described. This logic is executed, in one example, by the job scheduler executing one or more of the processing units of the processing environment. Further, this logic is executed for each type of resource to be shared by the users and/or groups of users of the environment. Initially, a determination is made as to an amount of a particular resource in the processing environment to be shared, STEP 200 (FIG. 2). In one embodiment, it is the total amount of the resource that is determined. The total amount of the resource is all the resource available in the processing environment from the past to the present with a decay function applied, such that the amount of a resource counts less and less as the time is farther and farther away from the present time. For example, to determine the total amount of CPU resource, the following formula is used: Total Amount of CPU Resource=(total number of processors)*$\int exp(-k*t) =$ total number of processors/k, where k is a decay constant that determines the speed of the decaying process, and is an input to the function; and t is the amount of elapsed time.

As one particular example of determining the amount of resource, if central processor (CPU) resources are to be shared, then the number of processors available in the processing environment is determined. This determination is made by, for instance, analyzing statistical information provided by the processing units. For example, each processing unit informs the manager (or managers) executing the job scheduler of the number of central processors available on that processing unit. The manager accumulates this information, applies a decay function, and inputs the result to the job scheduler.

The amount of resource obtained is then divided into a total number of desired shares, STEP 202. The total number of desired shares is chosen by an administrator, in one example. Typically, if there is a large number of users in the environment, then a large number of shares is desired. The larger the total number of shares, the more sensitive the number of used shares is to the resource usage. Examples of the total number of shares include 100 shares, 1000 shares, or any desired number.

Shares are then allocated to one or more users and/or groups of users of the processing environment, STEP 204. This allocation may also be specified by an administrator and provided as an input to the scheduler program, or the program can include a heuristic or formula to define the allocation. One or more factors may be used to determine the allocation, including, but not limited to, budget, importance, administrator's choice, etc. Examples of various allocations include: User 1 is allocated 10 shares; User 2 is allocated 5 shares; Group 1 is allocated 20 shares, etc.

Subsequent to allocating the shares to the desired users and/or groups of users, entitled resource proportions for those users and/or groups of users are determined, STEP 206. This proportion is determined by dividing the number of shares allocated to a user by the total number of shares of the environment. Thus, if there are 100 total shares, and User 1 is allocated 10 shares, then the proportion for user 1 is 10%. Similarly, the proportion for User 2 is 5% and for Group 1 is 20%, etc.

Figure 3:
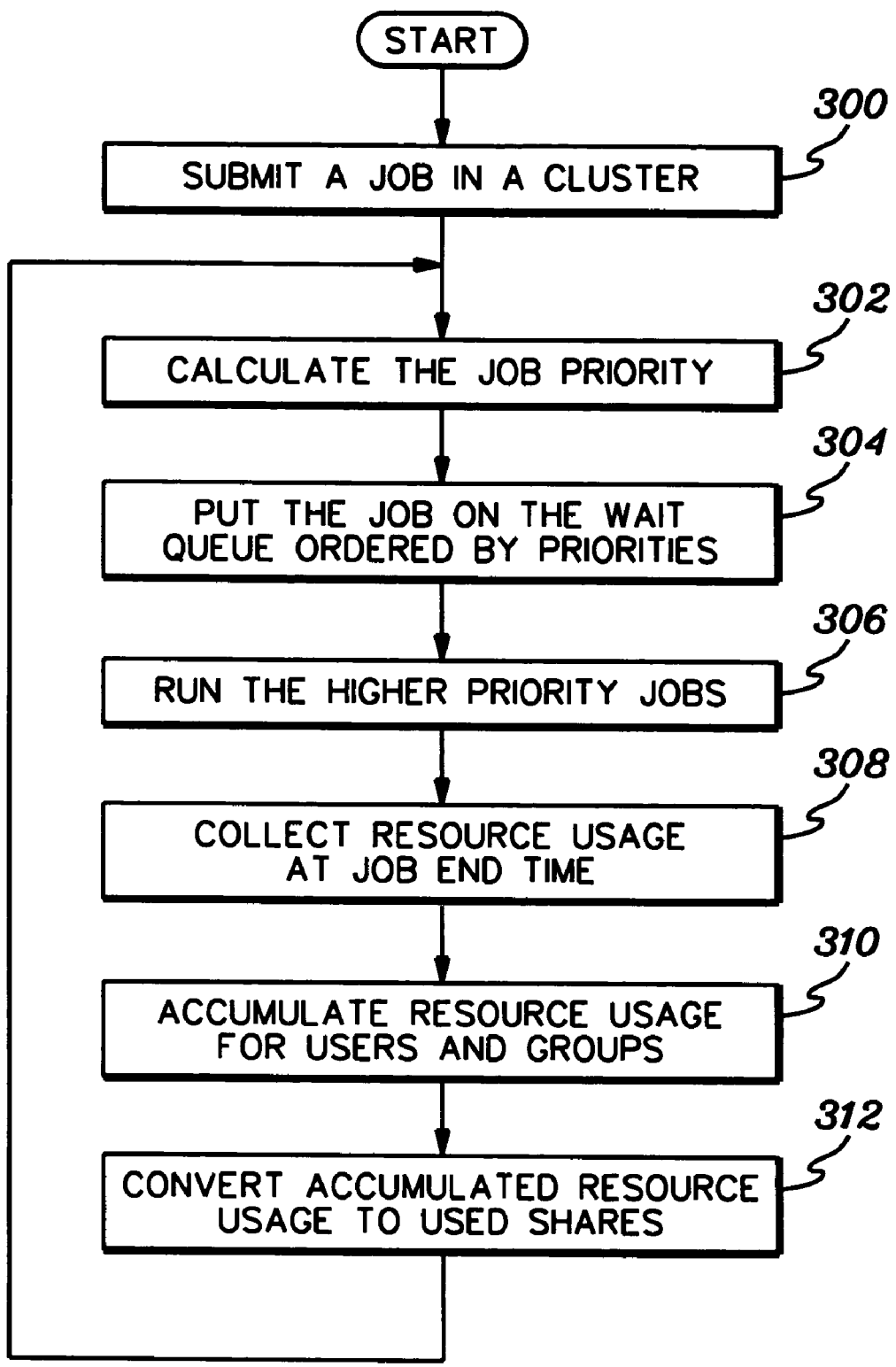
FIG. 3 depicts one embodiment of the logic associated with submitting and executing a job based on fair share scheduling, in accordance with an aspect of the present invention.

Subsequent to allocating the shares to the user entities, a user entity may run jobs, which are scheduled based on its allocated and used shares. That is, the priority of a job to be scheduled is based on the number of allocated shares the user entity requesting the scheduling has and how many of the user entity's shares are used. Generally, having remaining shares or the more shares remaining, the higher the job priority. One embodiment of the logic associated with scheduling jobs in accordance with a fair share scheduling technique of one aspect of the present invention is described with reference to FIG. 3. As one example, the job scheduler is performing the logic (except for STEP 300).

Initially, a user submits a job to run in the processing environment, STEP 300, and the priority of the job is calculated by, for instance, the job scheduler, STEP 302. There are many ways to determine job priority and many variables that can be used in the determination. Examples of these variables include, for instance:

(a) UserTotalShares—The total number of shares allocated to a user by an administrator.
(b) UserUsedShares—The number of shares used by the user, which is calculated by the job scheduler.
(c) UserRemainingShares—The difference between the values of UserTotalShares and UserUsed Shares.
(d) UserHasShares—A derived value that indicates whether the user has remaining shares (e.g., a 0 indicates no remaining shares; a 1 indicates at least 1 remaining share).
(e) UserSharesExceeded—A value that indicates whether the user has exceeded its number of shares (e.g., a 0 indicates it has not exceeded its number of shares; a 1 indicates it has).
(f) GroupTotalShares—The total number of shares allocated to a group of users by an administrator.
(g) GroupUsedShares—The number of shares used by the group, which is calculated by the job scheduler.
(h) GroupRemainingShares—The difference between the values of GroupTotalShares and GroupUsedShares.
(i) GroupHasShares—A derived value that indicates whether the group has remaining shares (e.g., a 0 indicates no remaining shares; a 1 indicates at least 1 remaining share).
(j) GroupSharesExceeded—A value that indicates whether the group has exceeded its number of shares (e.g., a 0 indicates it has not exceeded its number of shares; a 1 indicates it has).

Figure 4:
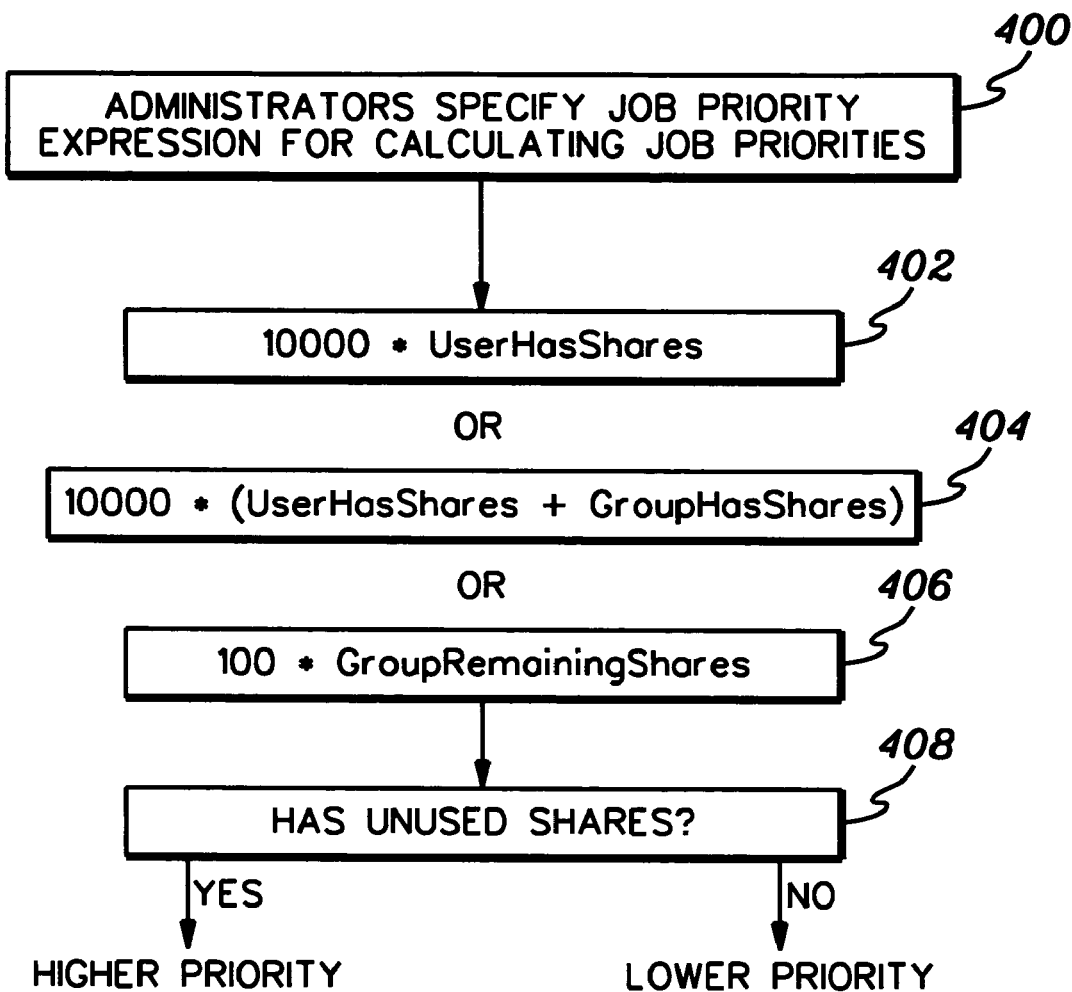
FIG. 4 depicts examples of job priority expressions used to calculate job priorities used in fair share scheduling, in accordance with an aspect of the present invention.

One or more of the above values are used in a job priority expression to calculate job priorities. Examples of these expressions are described with reference to FIG. 4. An administrator can specify one or more job priority expressions used to calculate job priorities, STEP 400. Examples of these expressions include:

10000*UserHasShares (402);

10000*(UserHasShares+GroupHasShares) (404);

100*GroupRemainingShares (406).

There are many other expressions that are possible.

If, based on the selected expression, a user still has unused shares, INQUIRY 408, then its priority is higher than if all of its shares have been used. In one example, the priority value is the result of the selected priority expression. For instance, if the selected expression is 402 above, and if UserHasShares=1, then the priority is 10000.

Returning to FIG. 3, subsequent to determining the priority of the job, the job is placed on a wait queue ordered by priorities, STEP 304. Then, the jobs are run with the higher priority jobs being run first, STEP 306.

As a job ends, resource usage is collected for that job by the job scheduler, STEP 308. In particular, in one example, a job belongs to a user and a group of users, and resources used by that job are collected and accumulated for the user, as well as for the group, STEP 310. This usage is collected by the scheduler accessing appropriate information at job termination, as one example. A further example of the collection and accumulation of resource usage is described in co-pending, co-filed application, entitled "Fault Tolerant Facility For The Aggregation Of Data From Multiple Processing Units," Brelsford et al., U.S. Ser. No. 11/412,757, filed herewith, which is hereby incorporated herein by reference in its entirety.

The accumulated resource usage is then converted to used shares, STEP 312. For instance, the UserUsedShares is calculated by dividing the accumulated resource usage for the user by the resources per share (Resources per share=Total Resources/Total number of shares). In one example, the Total Resources is subject to the same decay function as the used resources, if they are time sensitive quantities, i.e., if they disappear with time, like an hour of CPU.). Similarly, GroupUsedShares is determined by dividing the accumulated resource usage for the group by resources per share.

Subsequent to converting the accumulated resource usage to used shares, processing continues with calculating the job priority for the next job, STEP 302.

Figure 5:
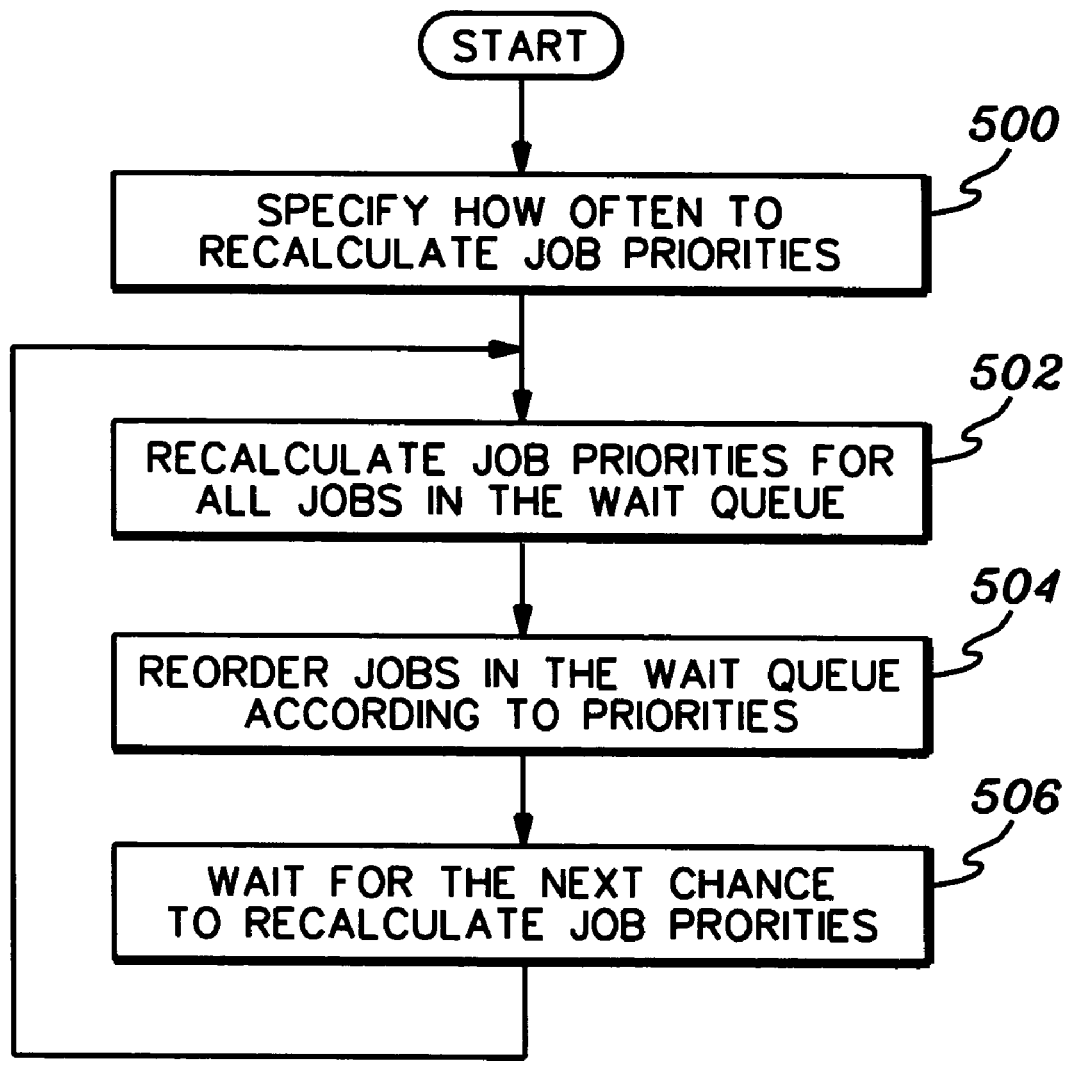
FIG. 5 depicts one embodiment of the logic associated with recalculating job priorities, in accordance with an aspect of the present invention.

At periodic intervals, the priorities of the jobs in the job wait queue are recalculated by the job scheduler, in one example. One embodiment of the logic associated with this processing is described with reference to FIG. 5. Initially, a determination is made as to how often to recalculate the job priorities, STEP 500. As one example, a time interval of every 5 minutes is selected by, for instance, an administrator. Other intervals may also be chosen.

At the end of the specified time interval, job priorities for all jobs in the wait queue (or a portion thereof, if preferred) are recalculated using any desired expression and/or variables, as described above, STEP 502. The jobs in the wait queue are then reordered according to the new priorities, STEP 504. Thereafter, the logic waits for the next chance to recalculate the job priorities, STEP 506. When, for instance, the time interval expires, processing then continues with recalculating job priorities, STEP 502.

Figure 6:
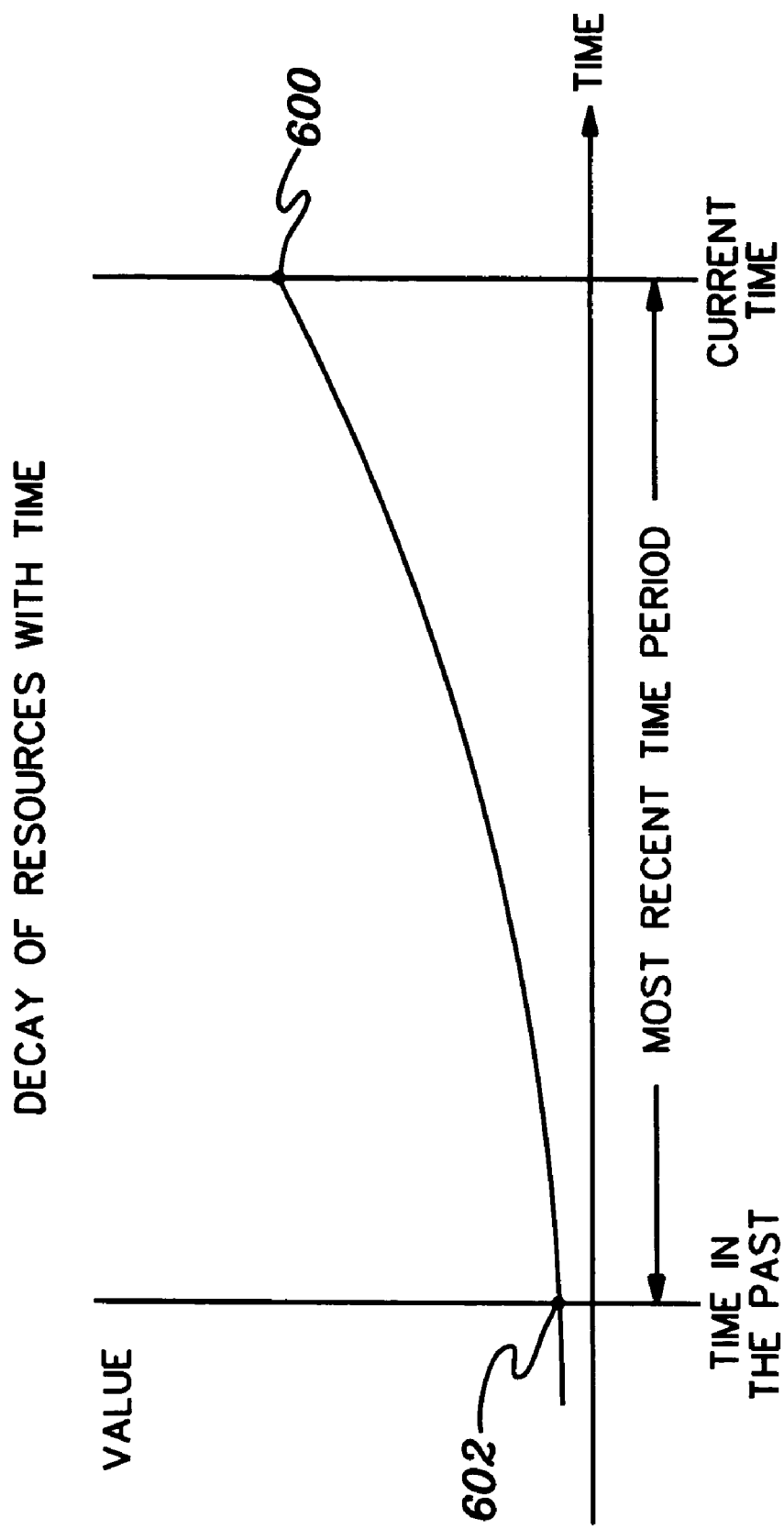
FIG. 6 pictorially depicts a decaying of resources with time, in accordance with an aspect of the present invention.

As previously described, when a job ends, resource usage is collected and accumulated, and then the accumulated usage is converted to used shares. This accumulated resource usage is historic in nature and influences scheduling decisions. The collection and accumulation of resource usage can be performed in a number of ways. However, in accordance with one aspect of the present invention, the recent resource usage is counted more heavily than the distant usage. That is, the same amount of resources has less value as time goes by. For example, as shown in FIG. 6, at current time, resource usage is at its greatest value (600), while the more distant the time, the less value (602).

In one example, only one accumulative data is recorded for the historic resource usage by each user or group. Further, there is no need to discard any old data, as the influence of a resource usage data decreases naturally with time in the accumulative data. The accumulative data includes contribution from all past resource usage data (or a selected amount) and a finite interval is not needed. A decay mechanism is applied substantially continuously during the data accumulation process, such that the accumulative data reflects the overall time-decayed resource usage.

In one embodiment, the decay function employed is an exponential function: $\exp(-k^*t)$, in which k is a decay constant that determines the speed of the decaying process, and is an input to the function; and t is the amount of elapsed time, since the resource usage was first reported or collected.

When a resource usage, R1, is collected, its contribution to the accumulative historic resource usage decreases according to the decay function. When a new resource usage, R2, is collected, it is added directly to the decayed value of R1 at the time, and the accumulative value is decayed together as time goes by. This process can be repeated as new resource usages are collected. Thus, it is no longer necessary to keep track of individual resource usage. It is sufficient to keep track of the accumulative resource usage data. The property of such an exponential function is represented, as follows:

$R1^*\exp(-k^*(t-t1))+$ $R2^*\exp(-k^*(t-t2))+$ $R3^*\exp(-k^*(t-t3))=S4$ with $S1=R1$ (at time $t1$)

$S2=S1^*\exp(-k^*(t2-t1))+R2$ (at time $t2$)

$S3=S2^*\exp(-k^*(t3-t2))+R3$ (at time $t3$)

$S4=S3^*\exp(-k^*(t-t3))$ (at time $t$).

Figure 7:
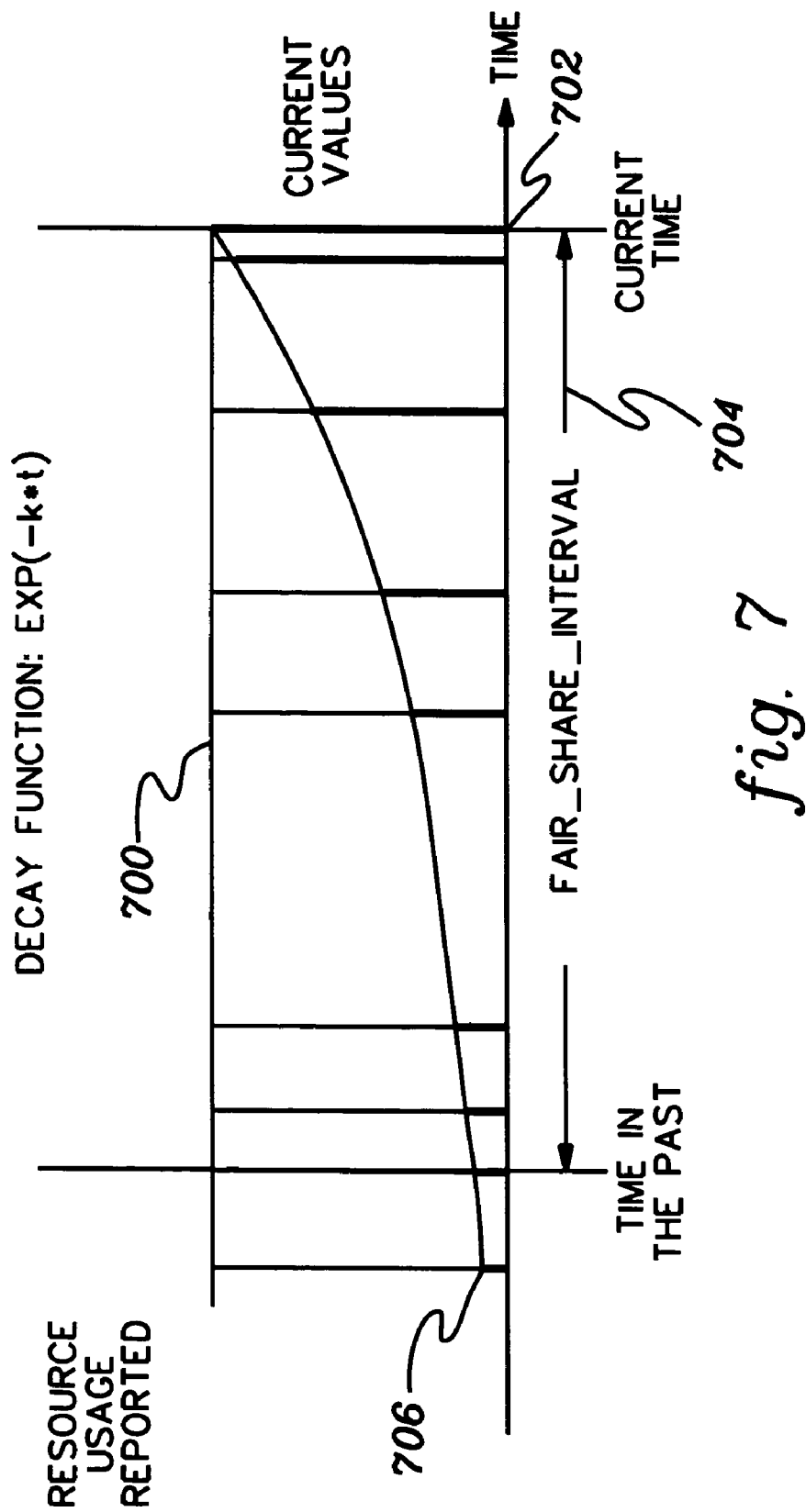
FIG. 7 is a further pictorial depiction of the decaying of resources over time, in accordance with an aspect of the present invention.

One pictorial depiction of this decay function is shown in FIG. 7. As shown, the vertical lines connecting with a horizontal line 700 represent the initial values of the reported resource usages at different times in the past, which are the same throughout time, in this example. The part of the vertical lines under the exponential curve represent the current values of the initially reported resource usage values. At current time 702, its value is at peak. A fair share interval 704 is selected that determines the decay constant. In one example, the fair share interval equals 5% of life, which is the time needed to decay to 5% of initial value. Resource usage reported at time 706 has a value at the current time, which is less than 5% of the initially reported value.

Figure 8:
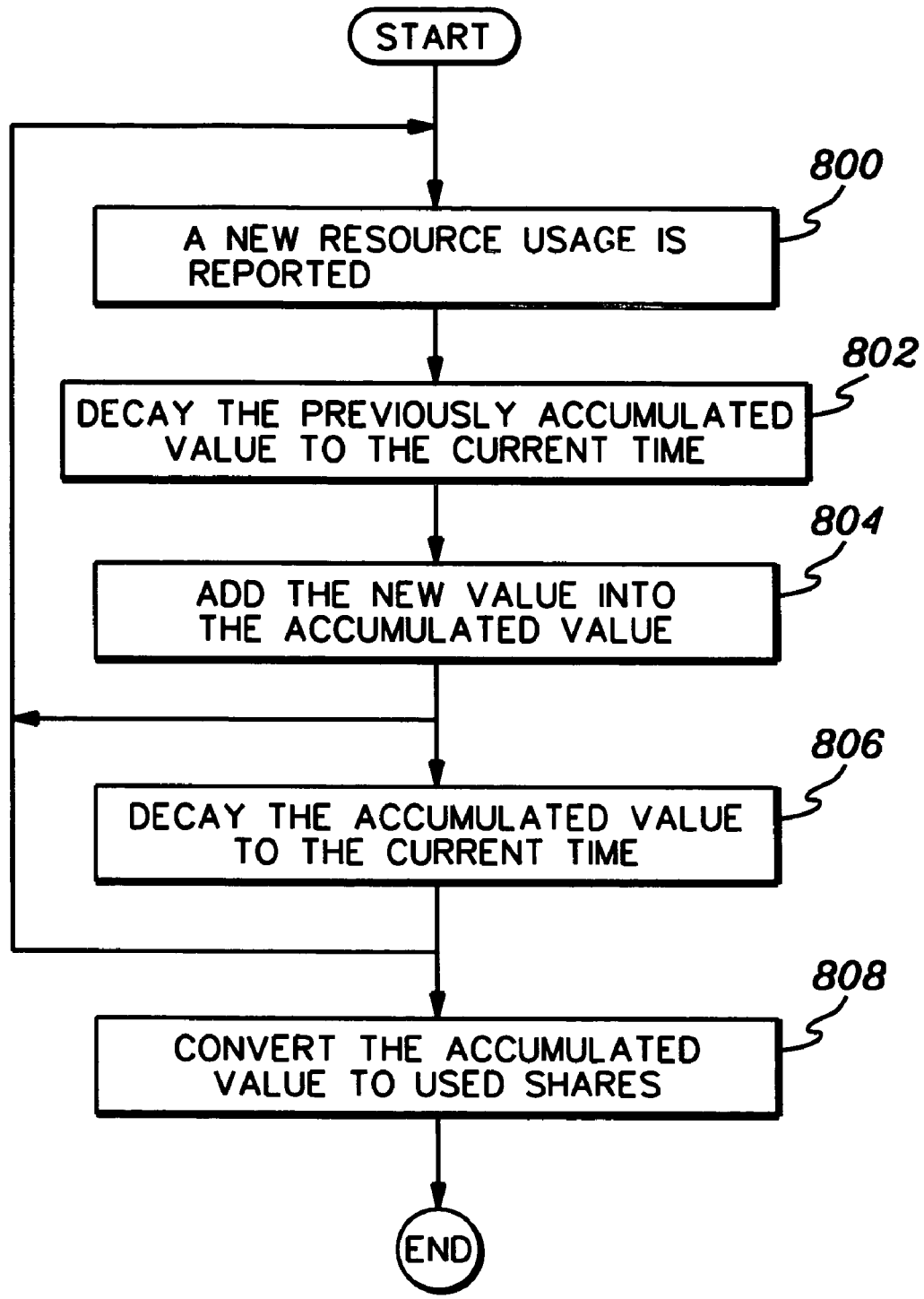
FIG. 8 depicts one embodiment of the logic associated with accumulating resource usage for fair share scheduling, in accordance with an aspect of the present invention.

Using the decay function to decay the accumulated resource usage is described with reference to FIG. 8. In one embodiment, a new resource usage is reported to the scheduler, in response to, for instance, termination of a job or periodically, STEP 800. The scheduler then decays the previously accumulated value to the current time, STEP 802, and the new value is added to the accumulated value, STEP 804. For instance, if 5 minutes ago (t), the collected value was 100 CPU minutes, then that value is decayed by multiplying 100× $\exp(-k^*5)$ to obtain a result. Then, the new usage at the current time, e.g., 110 CPU minutes, is added to the result, which is the new accumulated value. Processing then continues with STEP 800.

Further, to calculate the used shares, the new accumulated value is decayed to the current time, STEP 806, and the decayed accumulated value is converted to used shares, STEP 808. This processing is performed by, for instance, the scheduler.

Described in detail above is a fair share scheduling capability that enables the division of resources to be based on the total available resources of the environment, rather than the amount of resources consumed by others. This manner of dividing resources and defining shares is more stable and fair. It is more stable, since it is independent of the current workload. It is more fair because the number of shares the user consumes depends on the amount of resources the user has and the amount of resources the user has used, instead of the amount of resources other users happen to use.

The amount of resources used by a user entity is recorded and used to determine the number of used shares. In one example, a decay mechanism is applied against the historic resource usage to place more weight on recent usage. Advantageously, the amount of data that is tracked is greatly reduced, since only one piece of data, which includes, for instance, the resource usages collected in the past and the timestamp when the data was updated, is tracked for each user entity. Further, there is no need to limit historic resource usage to be within a finite time interval. The most significant contribution comes naturally from the most recent historic resource usages. This is a simple and easy technique to record usage information that increases performance and reduces software development efforts.

The recorded historic resource usage, with the appropriate decay applied, is divided by the per-share resource amount to obtain the number of used shares for the user and/or group. The per-share resource amount is subject to the same decay mechanism. The total amount of resource from the distant past to the current time is infinite without decay. With the decay function applied to resources in each instant of time and integration from the distant past to the current time, the total amount of resource is a finite quantity. The per-share resource amount is obtained by dividing this finite quantity by the total number of shares. The number of used and allocated shares are used in determining the job scheduling priority in an attempt to enable a user to use the proportion of resources it is entitled to use. Since the number of used and/or allocated shares change continuously, job priorities are recalculated from time to time.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of one or more aspects of the present invention. The article of manufacture can be included as a part of a computer system or sold separately.

Figure 9:
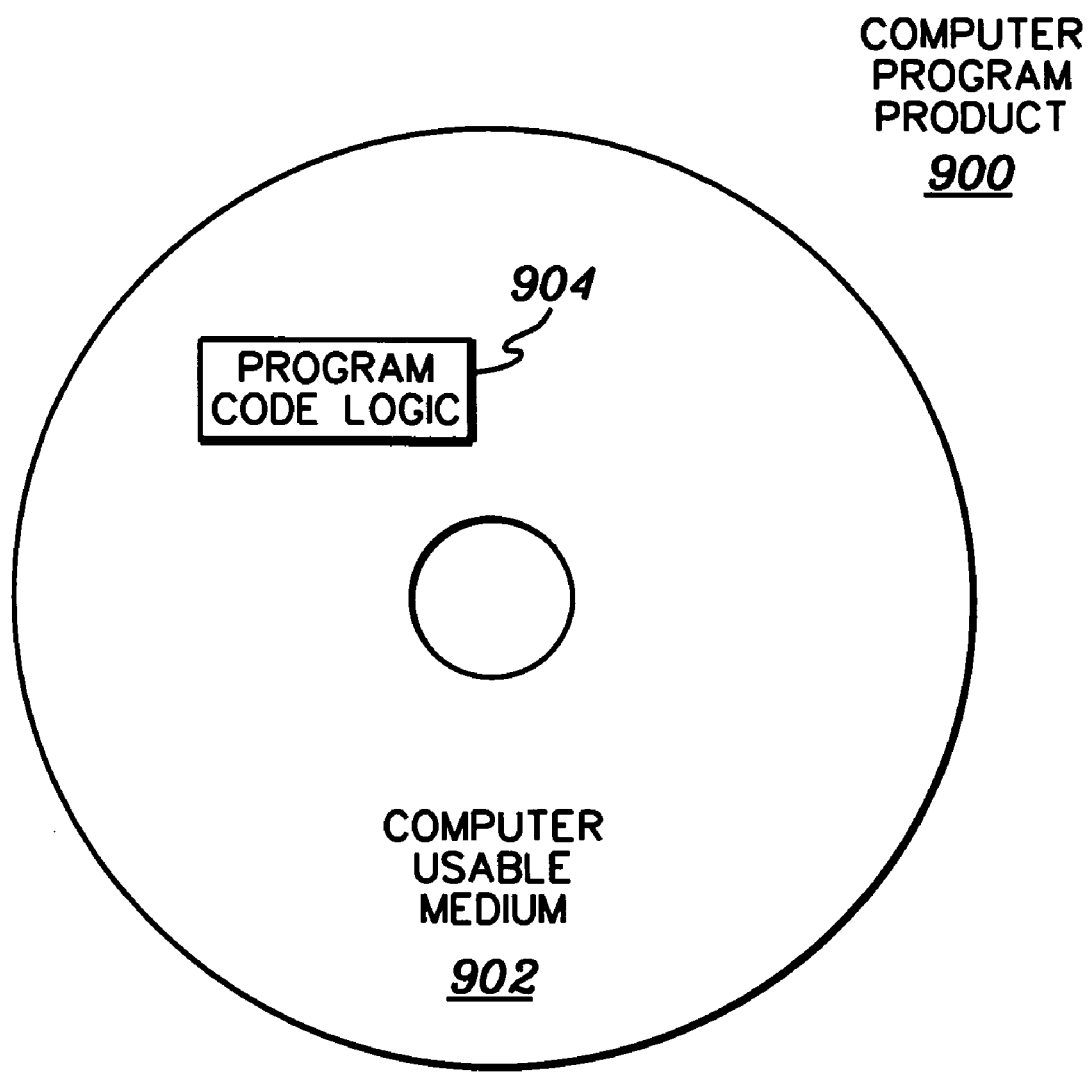
FIG. 9 depicts one example of a computer program product incorporating one or more aspects of the present invention.

One example of an article of manufacture or a computer program product incorporating one or more aspects of the present invention is described with reference to FIG. 9. A computer program product 900 includes, for instance, one or more computer usable media 902 to store computer readable program code means or logic 904 thereon to provide and facilitate one or more aspects of the present invention. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk—read/write (CD-R/W) and DVD.

A sequence of program instructions or a logical assembly of one or more interrelated modules defined by one or more computer readable program code means or logic direct the performance of one or more aspects of the present invention.

One or more aspects of the fair share scheduling capability described herein are or can be included in various products, including, but not limited to, workload management products, such as Tivoli Workload Scheduler LoadLeveler® offered by International Business Machines Corporation. ("LoadLeveler" is a registered trademark of International Business Machines Corporation, Armonk, N.Y.). Other products, including, but not limited to, other workload management products, can include one or more aspects of the present invention.

Advantageously, one or more aspects of the present invention allow the total amount of resource available in the processing environment to be divided into a finite number of shares, which is the total number of shares of the resource in the processing environment. Administrators specify the total number of shares that resources are divided into and the number of shares that each user or group of users is allocated. The ratio of the allocated shares versus the total number of shares specifies the proportion of resources allocated to a user entity. The proportion defined is independent of the amount of the resources consumed by other user entities and the job scheduling priority is independent of use of the resource by other user entities. This way of assigning resource proportion entitlement has the advantage of being able to adjust the sensitivity of the number of used shares to the resource usage and making it easy and flexible to allocate shares to users or groups. The resource value of a share is stable given a cluster of a fixed amount of resources. Further, advantageously, administrators are allowed to specify how the used and allocated shares affect the job scheduling priorities to achieve their goal of fairly sharing cluster resources among users and groups of users. This gives administrators the flexibility to adjust how much influence fair share scheduling is to have on job scheduling in a cluster of machines. With one or more aspects of the present invention, real resources are shared effectively over a period of time, as resource usage long ago contributes little to the historic resource usage data, due to decay.

Although one or more examples have been provided herein, these are only examples. Many variations of these examples can be made without departing from the spirit of the present invention. For instance, processing environments other than the examples provided herein may include and/or benefit from one or more aspects of the present invention. For example, the environment may not be a clustered environment and/or it may include more or less processing units than described herein. Yet further, the environment may include an operating system other than Linux or AIX®. Still further, other networks and/or connections than those described herein may be used. Still further, one or more of the processing units may be different than a pSeries® server. Many other variations exists.

For instance, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method of facilitating determination of scheduling priorities of jobs in a processing environment, said method comprising:

obtaining an indication of an amount of a resource that is available in the processing environment, this amount being independent of consumption of the resource and subject to an exponential decay function;

dividing the amount of the resource among a plurality of usage shares;

allocating one or more usage shares of the resource to a user entity of the processing environment, said one or more usage shares being at least a portion of a plurality of usage shares defined for the processing environment based on a total amount of the resource available in the processing environment and the one or more usage shares representing an amount of the resource available for use by the user entity independent of an amount of the resource consumed by other user entities of the processing environment, wherein the one or more usage shares allocated to the user entity represents a portion of the total amount of the resource available in the processing environment;

assigning a job scheduling priority to a job of the user entity to be executed, said job scheduling priority being based on how many usage share have been allocated to the user entity and how many usage shares have been used by the user entity and is independent of historic usage of the resource by other user entities; and collecting resource usage data, wherein the collecting comprises accumulating data associated with usage of the resource by the user entity, said accumulated data including contribution from past resource usage by the user entity, and wherein a decay function is applied at least once during the accumulating.

2. The method of claim 1, wherein the assigning comprises calculating the job scheduling priority, said calculating using an expression based on at least one of an indication of whether the user entity has unused shares and a number of remaining shares of the user entity.

3. The method of claim 2, wherein at least one of the following applies:
the more unused shares of the user entity, the higher the job scheduling priority;
the higher the job scheduling priority for user entities with unused shares; and
the lower the job scheduling priority for user entities who have used up or exceeded their allocated shares.

4. The method of claim 1, further comprising recalculating the job scheduling priority at one or more periodic intervals.

5. The method of claim 1, further comprising:
executing the job; and
collecting the resource usage data in response to termination of the job.

6. The method of claim 5, wherein the decay function places more weight on recent usage of the resource and less weight on more distant usage of the resource.

7. The method of claim 5, wherein the decay function comprises an exponential decay function.

8. The method of claim 5, wherein the accumulated data is converted to used shares of the user entity and is used in calculating a job scheduling priority for a job of the user entity.

9. A method of facilitating determination of scheduling priorities of jobs in a clustered computing environment comprising a plurality of coupled computing units, said method comprising:
selecting a number of usage shares of a resource of the clustered computing environment that is to be available for allocation to one or more user entities of the clustered computing environment;
obtaining an indication of an amount of the resource that is available in the clustered computing environment, the amount being independent of consumption of the resource and subject to an exponential decay function;

dividing the amount of the resource among the selected number of usage shares;

allocating one or more usage shares of the selected number of usage shares to a user entity of the clustered computing environment, the one or more usage shares allocated to the user entity representing a portion of the amount of the resource available in the clustered computing environment and representing an amount of the resource available for use by the user entity independent of an amount of the resource consumed by other user entities of the processing environment;

determining job scheduling priority for a job of the user entity to be executed, said determining being based on used usage shares of the user entity as compared to allocated usage shares of the user entity, and is independent of use of the resource by one or more other user entities;

scheduling the job to execute based on the job scheduling priority; and collecting resource usage data, in response to at least one of termination of the job and periodically, wherein the collecting comprises accumulating data associated with usage of the resource by the user entity, said accumulated data including contribution from past resource usage by the user entity, if any, and wherein an exponential decay function is applied at least once during the accumulating, said collected resource usage data being usable for determining job scheduling priority for one or more other jobs of said user entity.

10. A computer system for facilitating determination of scheduling priorities of jobs in a processing environment, said computer system comprising:
a memory; and
a processor in communications with the memory, wherein the computer system is configured to perform a method comprising:
obtaining an indication of an amount of a resource that is available in the processing environment, this amount being independent of consumption of the resource and subject to an exponential decay function;

dividing the amount of resource among a plurality of usage shares;

allocating one or more usage shares of the resource to a user entity of the processing environment, said one or more usage shares being at least a portion of a plurality of usage shares defined for the processing environment based on a total amount of the resource available in the processing environment and the one or more usage shares representing an amount of the resource available for use by the user entity independent of an amount of the resource consumed by other user entities of the processing environment, wherein the one or more usage shares allocated to the user entity represents a portion of the total amount of the resource available in the processing environment;

assigning a job scheduling priority to a job of the user entity to be executed, said job scheduling priority being based on how many usage shares have been allocated to the user entity and how many usage shares have been used by the user entity and is independent of historic of the resource by other user entities; and collecting resource usage data, wherein the collecting comprises accumulating data associated with usage of the resource by the user entity, said accumulated data including contribution from past resource usage by the user entity, and wherein an exponential decay function is applied at least once during the accumulating.

11. The computer system of claim 10, further comprising:
executing the job; and
collecting the resource usage data in response to termination of the job.

12. The computer system of claim 11, wherein the accumulated data is converted to used shares of the user entity and is used in calculating a job scheduling priority for a job of the user entity.

13. A computer program product for facilitating determination of scheduling priorities of jobs in a processing environment, the computer program product comprising:
a non-transitory computer readable storage medium readable by a processor and storing instructions for execution by the processor to perform a method comprising:
obtaining an indication of an amount of a resource that is available in the processing environment, this amount being independent of consumption of the resource and subject to an exponential decay function;
dividing the amount of the resource among a plurality of usage shares;
allocating one or more usage shares of the resource to a user entity of the processing environment, said one or more usage shares being at least a portion of a plurality of usage shares defined for the processing environment based on a total amount of the resource available in the processing environment and the one or more usage shares representing an amount of the resource available for use by the user entity independent of an amount of the resource consumed by other user entities of the processing environment, wherein the one or more usage shares allocated to the user entity represents a portion of the total amount of the resource available in the processing environment;
assigning a job scheduling priority to a job of the user entity to be executed, said job scheduling priority being based on how many usage shares have been allocated to the user entity and how many usage shares have been used by the user entity and is independent of historic usage of the resource by other user entities; and
collecting resource usage data, wherein the collecting comprises accumulating data associated with usage of the resource by the user entity, said accumulated data including contribution from past resource usage by the user entity, and wherein an exponential decay function is applied at least once during the accumulating.

14. The computer program product of claim 13, wherein the assigning comprises calculating the job scheduling priority, the calculating using an expression based on at least one of an indication of whether the user entity has unused shares and a number of remaining shares of the user entity.

15. The computer program product of claim 13, further comprising:
executing the job; and
collecting the resource usage data in response to termination of the job.

16. The computer program product of claim 15, wherein the accumulated data is converted to used shares of the user entity and is used in calculating a job scheduling priority for a job of the user entity.

* * * * *